(12) United States Patent
Yamada et al.

(10) Patent No.: US 10,476,904 B2
(45) Date of Patent: Nov. 12, 2019

(54) NON-TRANSITORY RECORDING MEDIUM RECORDING CYBER-ATTACK ANALYSIS SUPPORTING PROGRAM, CYBER-ATTACK ANALYSIS SUPPORTING METHOD, AND CYBER-ATTACK ANALYSIS SUPPORTING APPARATUS

(71) Applicant: FUJITSU LIMITED, Kawasaki-shi, Kanagawa (JP)

(72) Inventors: Koji Yamada, Yokohama (JP); Kunihiko Yoshimura, Katsushika (JP); Kouta Tanabe, Zama (JP); Toshitaka Satomi, Yamato (JP); Ryusuke Masuoka, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 197 days.

(21) Appl. No.: 15/670,031

(22) Filed: Aug. 7, 2017

(65) Prior Publication Data
US 2018/0063177 A1    Mar. 1, 2018

(30) Foreign Application Priority Data

Aug. 26, 2016 (JP) ................................. 2016-166294

(51) Int. Cl.
  *H04L 29/06* (2006.01)
  *G06F 16/00* (2019.01)
  *G06F 21/55* (2013.01)

(52) U.S. Cl.
  CPC .......... *H04L 63/1425* (2013.01); *G06F 16/00* (2019.01); *G06F 21/552* (2013.01);
  (Continued)

(58) Field of Classification Search
  CPC ............ H04L 63/1416; H04L 63/1425; H04L 63/1433; H04L 63/1441; H04L 63/1408;
  (Continued)

(56) References Cited

U.S. PATENT DOCUMENTS 9,516,053 B1 * 12/2016 Muddu ................. G06F 16/254
9,686,308 B1 *  6/2017 Srivastava .............. H04L 51/12
(Continued)

FOREIGN PATENT DOCUMENTS

JP      2008-167099 A    7/2008
JP      4773332 B2       9/2011
(Continued)

OTHER PUBLICATIONS

Singapore Invitation to Respond to Written Opinion, Written Opinion and Search Report dated Feb. 21, 2018 for corresponding Singapore Patent Application No. 10201706430P, 8 pages.
(Continued)

*Primary Examiner* — Ali S Abyaneh
*Assistant Examiner* — Shu Chun Gao
(74) *Attorney, Agent, or Firm* — Fujitsu Patent Center

(57) ABSTRACT

A non-transitory recording medium recording a cyber-attack analysis supporting program that causes a computer to execute a process, the process includes: accepting registration of information of one or more items regarding a cyber-attack event in response to detection of malware in an information processing system of a monitoring target; and displaying the information registered regarding the cyber-attack event in a state in which each of the one or more items is coupled as a subordinate node to a representative node of the cyber-attack event.

13 Claims, 10 Drawing Sheets

(52) U.S. Cl.
CPC ........ *G06F 21/554* (2013.01); *H04L 63/1408* (2013.01); *H04L 63/1416* (2013.01); *H04L 63/1433* (2013.01); *H04L 63/1441* (2013.01); *H04L 2463/146* (2013.01)

(58) Field of Classification Search
CPC . H04L 2463/146; G06F 16/00; G06F 21/554; G06F 21/552
See application file for complete search history.

(56) References Cited

U.S. PATENT DOCUMENTS

| | | | | |
|---|---|---|---|---|
| 9,746,985 B1* | 8/2017 | Humayun | ............... | G06Q 10/10 |
| 9,760,697 B1* | 9/2017 | Walker | .................... | G06F 21/31 |
| 9,836,501 B2* | 12/2017 | Robichaud | .............. | G06F 16/00 |
| 9,870,465 B1* | 1/2018 | Levi | ....................... | H04L 67/306 |
| 2007/0140131 A1* | 6/2007 | Malloy | ................. | H04L 43/026 370/241 |
| 2007/0226796 A1* | 9/2007 | Gilbert | .................... | G06F 21/55 726/22 |
| 2015/0242637 A1* | 8/2015 | Tonn | ..................... | G06F 21/577 726/25 |
| 2015/0244734 A1 | 8/2015 | Olson et al. | | |
| 2017/0013018 A1 | 1/2017 | Nakata et al. | | |
| 2017/0063894 A1* | 3/2017 | Muddu | ................. | G06F 16/254 |
| 2019/0052660 A1* | 2/2019 | Cassidy | ................ | H04L 43/067 |
| 2019/0109865 A1* | 4/2019 | Kamper | ............. | H04L 63/1416 |

FOREIGN PATENT DOCUMENTS

| | | |
|---|---|---|
| JP | 2016-122262 A | 7/2016 |
| WO | 2004/111785 | 12/2004 |
| WO | 2015/141630 | 9/2015 |

OTHER PUBLICATIONS

Noel, Steven et al.,"Big-Data Architecture for Cyber Attack Graphs Representing Security Relationship in NoSQL Graph Databases", Dec. 31, 2015, XP055417525, Retrieved from the Internet: URL : http://csis.gmu.edu/noel/pubs/2015_IEEE_HST.pdf, 6 pages.
Extended European Search Report dated Nov. 10, 2017 for corresponding European Patent Application No. 17185499.5, 7 pages.
AJ Shipley, "Introducing ScoutPrime, Part 3—Treat Defense Operationalization", LookingGlass Cyber Solutions Inc., May 12, 2016 (Total: 9 pages).

* cited by examiner

FIG. 3

```
<!-- CYBER-ATTACK ACTIVITY -->
<stix:Campaigns>
<stix:Campaign xsi:type="campaign:CampaignType" id="IPA:campaign_example">
<campaign:Title>TITLE RELATING TO CYBER-ATTACK ACTIVITY</campaign:Title>
<campaign:Description>DESCRIPTION OF CYBER-ATTACK ACTIVITY</campaign:Description>
<campaign:Short_Description>OUTLINE OF CYBER-ATTACK ACTIVITY</campaign:Short_Description>
<campaign:Names>
<campaign:Name>NAME OF CYBER-ATTACK ACTIVITY</campaign:Name>
</campaign:Names>
<!-- INTENTION OF ATTACK ACTIVITY -->
<campaign:Intended_Effect>
<stixCommon:Value xsi:type="stixVocabs:IntendedEffectVocab-1.0">Unauthorized Access </stixCommon:Value>
</campaign:Intended_Effect>
<!-- STATE OF ATTACK ACTIVITY -->
<campaign:Status xsi:type="stixVocabs:CampaignStatusVocab-1.0">Historic</campaign:Status>
<!-- ATTACK METHOD RELATING TO ATTACK ACTIVITY -->
<campaign:Related_TTPs>
<stixCommon:TTP idref="IPA:ttp_example"/>
</campaign:Related_TTP>
</campaign:Related_TTPs>
<!-- INCIDENT RELATING TO ATTACK ACTIVITY -->
<campaign:Related_Incidents>
<campaign:Related_Incident>
<stixCommon:Incident idref="IPA:incident_example"/>
</campaign:Related_Incident>
</campaign:Related_Incidents>
```

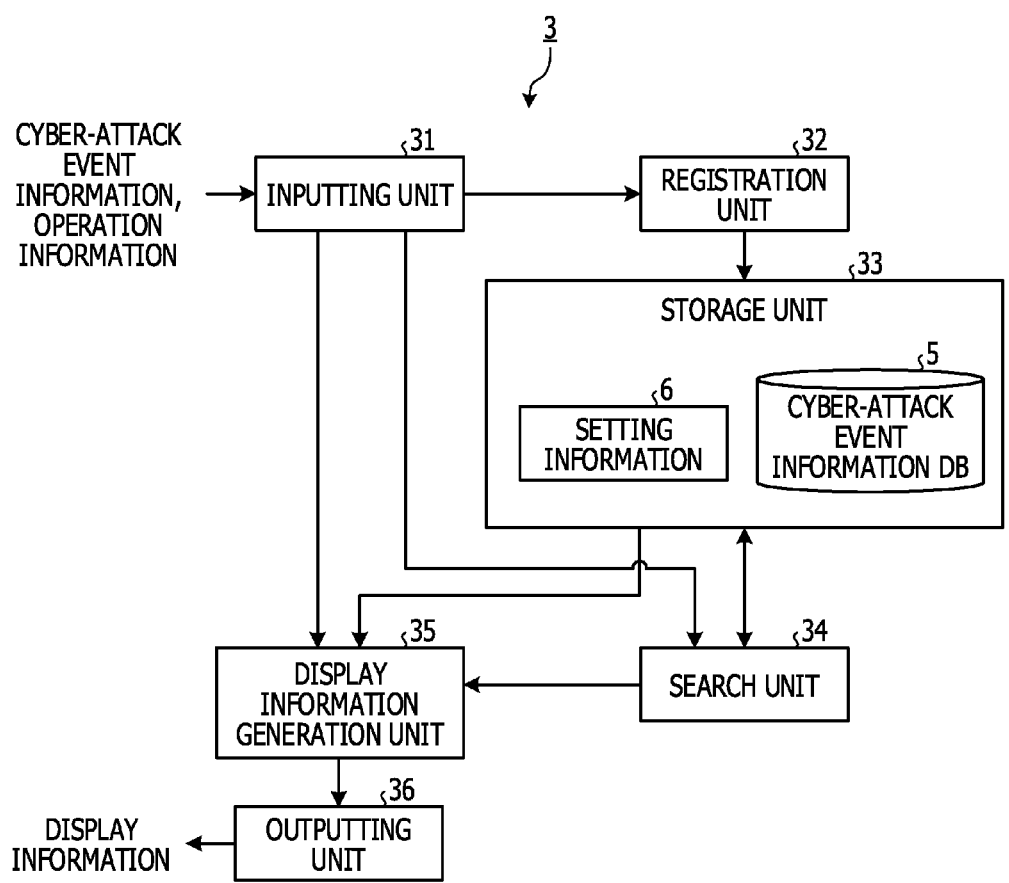

NON-TRANSITORY RECORDING MEDIUM RECORDING CYBER-ATTACK ANALYSIS SUPPORTING PROGRAM, CYBER-ATTACK ANALYSIS SUPPORTING METHOD, AND CYBER-ATTACK ANALYSIS SUPPORTING APPARATUS

CROSS-REFERENCE TO RELATED APPLICATION

This application is based upon and claims the benefit of priority of the prior Japanese Patent Application No. 2016-166294, filed on Aug. 26, 2016, the entire contents of which are incorporated herein by reference.

FIELD

The embodiment relates to a non-transitory recording medium recording a cyber-attack analysis supporting program, a cyber-attack analysis supporting method, and a cyber-attack analysis supporting apparatus.

BACKGROUND

A cyber-attack such as an illegal access through a network is carried out by a wide variety of methods.

A related art is disclosed in Japanese Patent No. 4773332.

SUMMARY

According to an aspect of the embodiment, a non-transitory recording medium recording a cyber-attack analysis supporting program that causes a computer to execute a process, the process includes: accepting registration of information of one or more items regarding a cyber-attack event in response to detection of malware in an information processing system of a monitoring target; and displaying the information registered regarding the cyber-attack event in a state in which each of the one or more items is coupled as a subordinate node to a representative node of the cyber-attack event.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of cyber-attack event information;

FIG. 4 depicts an example of a functional configuration of a server apparatus;

DESCRIPTION OF EMBODIMENT

In coping with a cyber-attack, event contents of a cyber-attack are analyzed and evaluated for each of cyber-attacks detected in the past.

In evaluation of a cyber-attack, incident meta information is extracted from detected information of a security incident. A generation scenario of a security incident detected using a scenario factor indicated in the extracted incident meta information is produced, and an evaluation value of the produced generation scenario is set.

For example, in the technology described above, although a user may know an evaluation value for each cyber-attack event, it may be difficult for the user to understand contents of the cyber-attack event.

For example, a cyber-attack event includes event contents for each of categories of an attacker (Threat_Actors), an attack method (TTPs), a detection index (Indicators), an observation event (Observables), an incident (Incidents), a corrective measure (Courses_Of_Action), and an attack target (Exploit_Targets). These event contents are characteristic in individual cyber-attack events. However, from a mere evaluation value, it may be difficult to grasp characteristic event contents in individual cyber-attack events.

For example, contents of a cyber-attack event may be presented in a straightforward manner to a user.

In the following description, elements having substantially same like functions are denoted by same reference symbols, and overlapping description of them may be omitted. For example, the recording medium on which a cyber-attack analysis supporting program is recorded, cyber-attack analysis supporting method, and cyber-attack analysis supporting apparatus hereinafter described merely indicate an example, and they may be combined suitably within a consistent range.

Figure 1:
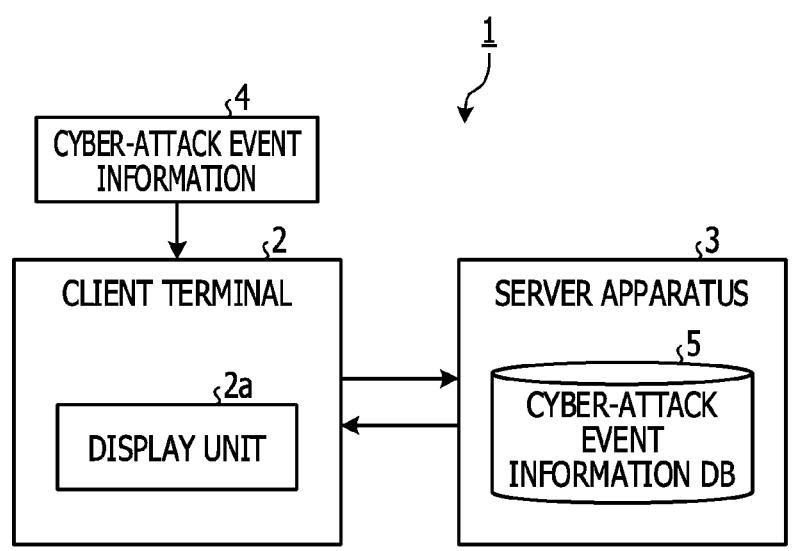
FIG. 1 depicts an example of an analysis supporting system.

FIG. 1 depicts an example of an analysis supporting system. As depicted in FIG. 1, an analysis supporting system 1 includes a client terminal 2 and a server apparatus 3. The client terminal 2 and the server apparatus 3 are coupled to be communicatable with each other through a communication network such as the Internet or a local area network (LAN).

The client terminal 2 may be a terminal apparatus utilized by a user, and a personal computer (PC), a tablet terminal or the like may be applied as the client terminal 2. The client terminal 2 accepts cyber-attack event information 4 relating to a cyber-attack event according to detection of malware in the information processing system of a monitoring target in response to an operation of the user or the like. The client terminal 2 transmits the accepted cyber-attack event information 4 to the server apparatus 3.

The server apparatus 3 registers the cyber-attack event information 4 accepted by the client terminal 2 into a cyber-attack event information database (DB) 5. The server apparatus 3 generates display information indicative of contents of the cyber-attack event information 4 accepted by the client terminal 2 and outputs the generated display information to the client terminal 2. The client terminal 2 displays the display information output from the server apparatus 3 on a display unit 2a such as a liquid crystal display unit to present contents of the cyber-attack event to the user.

The cyber-attack event information 4 is information indicative of a cyber-attack activity (also called campaign (Campaigns)) relating to a detected cyber-attack event such as detection of malware in the information processing system of a monitoring target. For example, the cyber-attack event information 4 may be described in a structured threat information eXpression (STIX) language according to STIX that is a technical specification for describing an item associated with a cyber-attack activity that takes in an event that characterizes a cyber-attack or the like.

For example, the cyber-attack event information 4 includes event contents for each of the categories of an attacker (Threat_Actors), an attack method (TTPs), a detection index (Indicators), an observation event (Observables), an incident (Incidents), a corrective measure (Courses_Of_Action), and an attack target (Exploit_Targets) together with a cyber-attack activity (Campaigns). TTP is an abbreviation of Tactics, Techniques and Procedures. The contents included in the cyber-attack event information 4 together with the cyber-attack activity may be part or all of an attacker, an attack method, a detection index, an observation event, an incident, a corrective measure, and an attack target.

Figure 2:
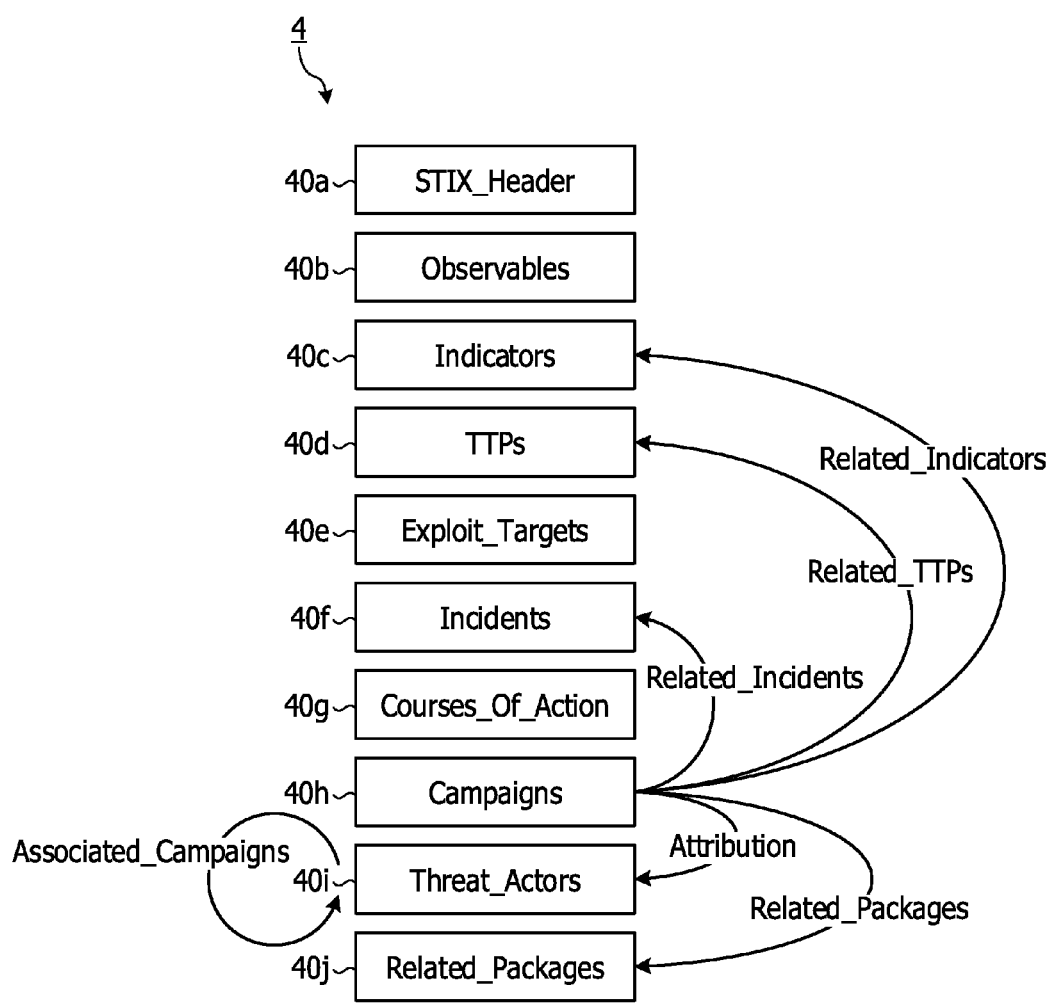
FIG. 2 illustrates an example of cyber-attack event information.

FIG. 2 illustrates an example of a cyber-attack event information. As depicted in FIG. 2, the cyber-attack event information 4 includes fields 40a and 40j for attached information of STIX_Header and Related_Packages, respectively, and fields 40b to 40i for information of items relating to a cyber-attack activity. In the cyber-attack event information 4, the fields 40a to 40j are associated with each other by links. For example, the field 40h for a cyber-attack activity (Campaigns) is linked to fields of items (for example, fields 40c, 40d, 40f, 40i, 40j and so forth).

In the field 40h for a cyber-attack activity (Campaigns), an intention, a state of an attack activity and so forth in a cyber-attack activity are described. For example, in the field 40h, information of an intention (Intended_Effect) of a cyber-attack activity/attacker is described individually. In the field 40h, an attack activity state (campaign: Status) is described individually.

In the field 40i for an attacker (Threat_Actors), information relating to a person/organization that contributes to a cyber-attack from such points of view as a type of an attacker of the cyber-attack, a motivation of the attacker, a proficiency of the attacker, an intention of the attacker and so forth is described individually. For example, in the field 40i, information of a transmission source mail address of a cyber-attack event and an account of a social network service is described.

In the field 40d for an attack method (TTPs), information relating to a pattern of an attack, a resource of malware or a tool used by an attacker, an attack base of the attacker, and an attack target is described individually. For example, the pattern of an attack (ttp: Attack_Pattern) is described using common attack pattern enumeration and classification (CAPEC: common attack pattern list).

In the field 40c for a detection index (Indicators), information indicative of an index that characterizes a cyber-attack event is described individually. For example, in the field 40c, an index that characterizes a cyber-attack is described together with a tool used to create a detection index from a type of a detection index, an observation event associated with the detection index, an attack stage phase, a trace and so forth.

In the field 40b for an observation event (Observables), information indicative of an event that relates to an operation observed in a cyber-attack event is described individually. For example, in the field 40b, as an event observed by a cyber-attack, a file name, a hash value or a file size, a value of a registry, a service in operation, a hypertext transfer protocol (HTTP) request and so forth are described. Further, for the description, cyber observable eXpression (CybOX) that is a specification for describing an observation event of a cyber-attack is used.

In the field 40f for an incident (Incidents), information of a case caused by a cyber-attack is described individually from such points of view as a classification regarding what the incident is, participants to the incident (a reporter, a responder, a coordinator, or a victim), assets suffering from the incident (an owner, a manager, or a place), a direct/indirect influence of the incident, a situation for coping with the incident and so forth. For example, in the field 40f, information of an owner or a manager of an asset suffering from an attacker of a cyber-attack and a place of the asset is described individually.

In the field 40g for a corrective measure (Courses_Of_Action), information indicative of a measure for coping with a threat by a cyber-attack event is described individually from such points of view as a situation of a corrective measure, a type of the corrective measure, or an object, an influence, a cost, or effectiveness of the corrective measure and so forth.

In the field 40e for an attack target (Exploit_Targets), information indicative of a weak point of an asset that becomes a target of an attack in a cyber-attack event such as a weak point of software or a system that may become a target of an attack is described individually from such points of view as vulnerability or a type, a setting, or a configuration of the vulnerability.

For example, in the field 40e, a common vulnerability and exposures (CVE: common vulnerability identifier) is used to describe the vulnerability. In the field 40e, a common weakness enumeration (CWE: common vulnerability type list) is used to describe a type of the vulnerability. In the field 40e, a common configuration enumeration (CCE: common security setting list) is used to describe a security problem on setting.

FIG. 3 illustrates an example of cyber-attack event information. As illustrated in FIG. 3, in the cyber-attack event information 4, the information described hereinabove is described in a tree structure from a factor of a root in which factors having tags allotted thereto are hierarchized (nested structured) in accordance with the eXtensible markup language (XML) format. For example, the cyber-attack event information 4 is described in a tree structure in which a cyber-attack activity, an attacker, an attack method, a detection index, an observation event, an incident, a corrective measure, an attack target and so forth in the cyber-attack event are set as factors (nodes) and information in each of the factors is set as a child factor (subordinate node).

FIG. 4 depicts an example of a functional configuration of a server apparatus. As depicted in FIG. 4, the server apparatus 3 includes an inputting unit 31, a registration unit 32, a storage unit 33, a search unit 34, a display information generation unit 35, and an outputting unit 36.

The inputting unit 31 accepts an input of information transmitted from the client terminal 2 through a communication network or the like. For example, the inputting unit 31 accepts cyber-attack event information 4 or operation information transmitted thereto from the client terminal 2. The operation information is information indicative of an operation instruction accepted by the client terminal 2 from the user through a user interface. The inputting unit 31 outputs the cyber-attack event information 4 accepted from the client terminal 2 to the registration unit 32, the search unit 34, and display information generation unit 35. The inputting unit 31 outputs the operation information accepted from the client terminal 2 to the display information generation unit 35.

The registration unit 32 registers the cyber-attack event information 4 accepted by the inputting unit 31 from the client terminal 2 into the cyber-attack event information DB 5 of the storage unit 33. The storage unit 33 may be a storage device such as a hard disk device 509 (refer to FIG. 10) and stores the cyber-attack event information DB 5 and the setting information 6.

The cyber-attack event information DB 5 is a database that allows registration and search of data therein. For example, the cyber-attack event information 4 accepted from the client terminal 2 is registered into the cyber-attack event information DB 5 with an identifier (ID) or the like allotted thereto by the registration unit 32.

The setting information 6 is information indicative of various kinds of setting contents inputted through the inputting unit 31 by the client terminal 2 and set in advance. For example, the setting information 6 includes information relating to display settings such as a rule applicable when display information to be transmitted to the client terminal 2 is generated by the display information generation unit 35. For example, the setting information 6 includes display settings of the size, color, display position and so forth of nodes 220, 220a, and 220b that are display targets in a display screen 200 (see FIG. 6).

The search unit 34 searches, based on the cyber-attack event information 4 accepted by the client terminal 2, for cyber-attack event information that satisfies a given similarity from within the cyber-attack event information registered in the cyber-attack event information DB 5 and outputs a result of the search to the display information generation unit 35.

For example, the search unit 34 compares the cyber-attack event information 4 accepted by the client terminal 2 and the cyber-attack event information registered in the cyber-attack event information DB 5 with each other. The search unit 34 compares child factors (information in factors) of the factors (a cyber-attack activity, an attacker, an attack method, a detection index, an observation event, an incident, a corrective measure, an attack target and so forth) in the cyber-attack events with each other to decide a similarity degree. For example, if the number of child factors whose contents coincide with each other is equal to or greater than a given number, the search unit 34 may decide that the factors have a high similarity degree to each other and the given similarity is satisfied. The search unit 34 outputs the cyber-attack event information searched out as the information that satisfies the given similarity within the cyber-attack event information DB 5 to the display information generation unit 35.

The display information generation unit 35 generates display information for displaying the cyber-attack event information 4 registered in regard to the cyber-attack event, for example, the cyber-attack event information 4 accepted by the client terminal 2.

For example, the display information generation unit 35 performs a syntax analysis of the cyber-attack event information 4 in the XML format and acquires information regarding the individual categories such as an attacker, an attack method, a detection index, an observation event, an incident, a corrective measure, or an attack target together with a cyber-attack activity. The display information generation unit 35 analyzes, based on a result of the syntax analysis, a tree structure in which the cyber-attack activity, the attacker, the attack method, the detection index, the observation event, the incident, the corrective measure, the attack target or the like in the cyber-attack event is set as a representative node and information in each node is set as a subordinate node. As an example, the display information generation unit 35 performs analysis of the tree structure by analyzing the nested structure of factors (nodes) to which tags are allotted. The display information generation unit 35 generates, based on a result of the analysis of the tree structure, display information for displaying the cyber-attack event information 4 such as a graph chart in which nodes are coupled to each other by coupling lines in accordance with the tree structure.

When the display information is generated, the display information generation unit 35 reads out the setting information 6 and determines the size, color, display position and so forth of each node in the graph chart in accordance with display settings set in advance.

The display information generation unit 35 generates display information indicative of the search contents based on the search result by the search unit 34. For example, the display information generation unit 35 generates display information for displaying the searched out cyber-attack event of the cyber-attack event information 4, a similarity degree of the number of child factors whose contents coincide with each other or the like.

The display information generated by the display information generation unit 35 is output to the outputting unit 36. The outputting unit 36 outputs the display information generated by the display information generation unit 35 to the client terminal 2.

Figure 5:
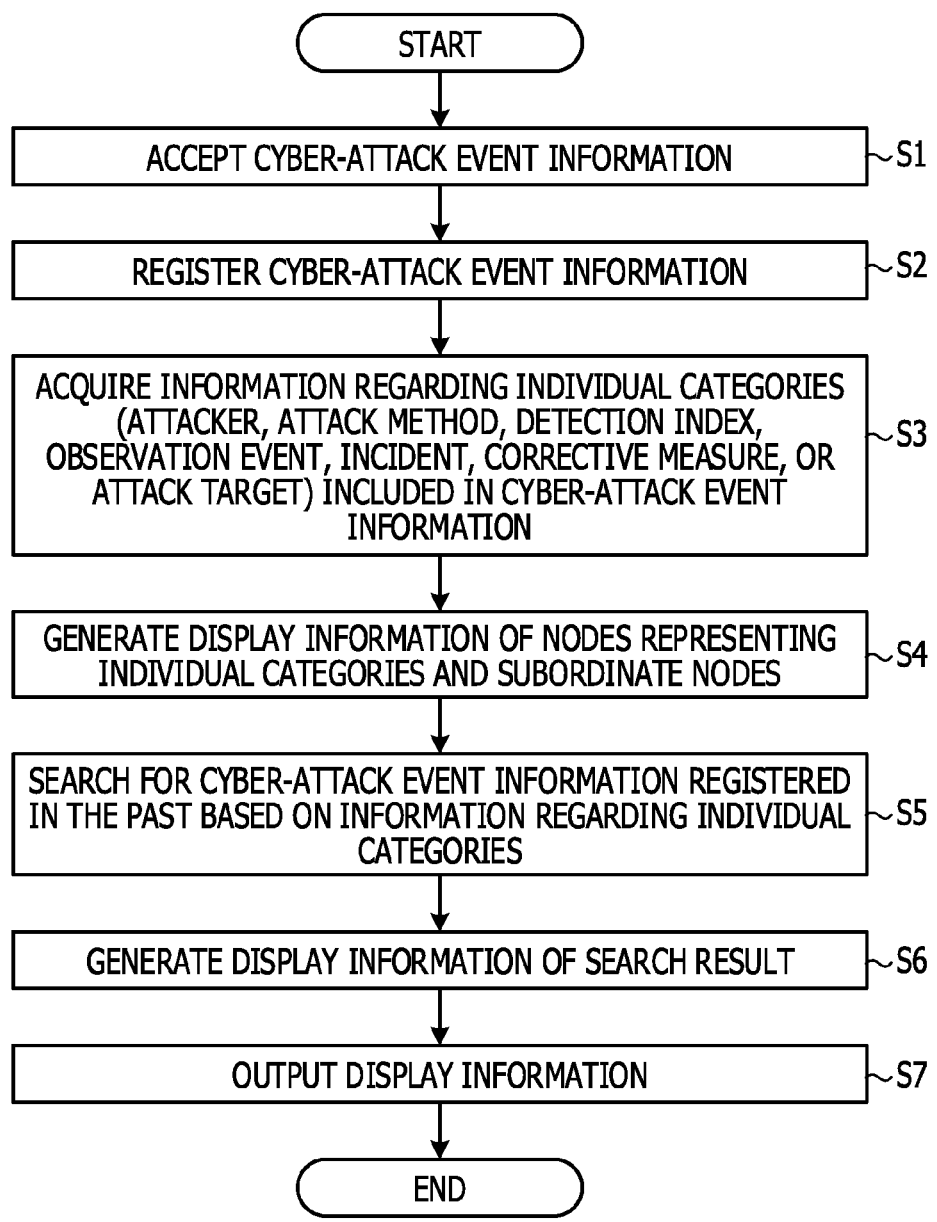
FIG. 5 illustrates an example of operation of a server apparatus.

FIG. 5 illustrates an example of operation of a server apparatus. As illustrated in FIG. 5, after process is started, the inputting unit 31 accepts cyber-attack event information 4 from the client terminal 2 (S1). The registration unit 32 registers the cyber-attack event information 4 accepted from the client terminal 2 into the cyber-attack event information DB 5 (S2).

The display information generation unit 35 performs a syntax analysis of the cyber-attack event information 4 accepted by the client terminal 2 to acquire information regarding the individual categories such as an attacker, an attack method, a detection index, an observation event, an incident, a corrective measure, or an attack target together with a cyber-attack activity (S3).

The display information generation unit 35 analyzes, based on the acquired information, a tree structure in which a cyber-attack activity, an attacker, an attack method, a detection index, an observation event, an incident, a corrective measure, an attack target or the like is set as a representative node and information in each node is set as a subordinate node. The display information generation unit 35 generates, based on a result of the analysis of the tree structure, a graph chart in which nodes are coupled to each other by coupling lines in accordance with the tree structure, for example, display information of the nodes representing the individual categories and the subordinate nodes (S4).

The search unit 34 searches the cyber-attack event information DB 5 based on the information regarding the individual categories in the cyber-attack event information 4 accepted from the client terminal 2 to search for information having a given similarity from within the cyber-attack event information registered in the past (S5). The display information generation unit 35 generates, based on a result of the search by the search unit 34, display information for displaying contents of the search result (S6).

The outputting unit 36 outputs the display information generated by the display information generation unit 35 to the client terminal 2 (S7). In this manner, in the client terminal 2, the display information generated by the server apparatus 3 is displayed on the display unit 2a. For example, on the display unit 2a, the contents of the cyber-attack event information 4, for example, a graph chart of a tree structure is displayed in which information in each of the nodes representing the cyber-attack activity, the attacker, the attack method, the detection index, the observation event, incident, the corrective measure, the attack target or the like, is set as a subordinate node. On the display unit 2a, a search result of cyber-attack event information registered in the past and having a given similarity to the cyber-attack event information 4 is displayed.

Figure 6:
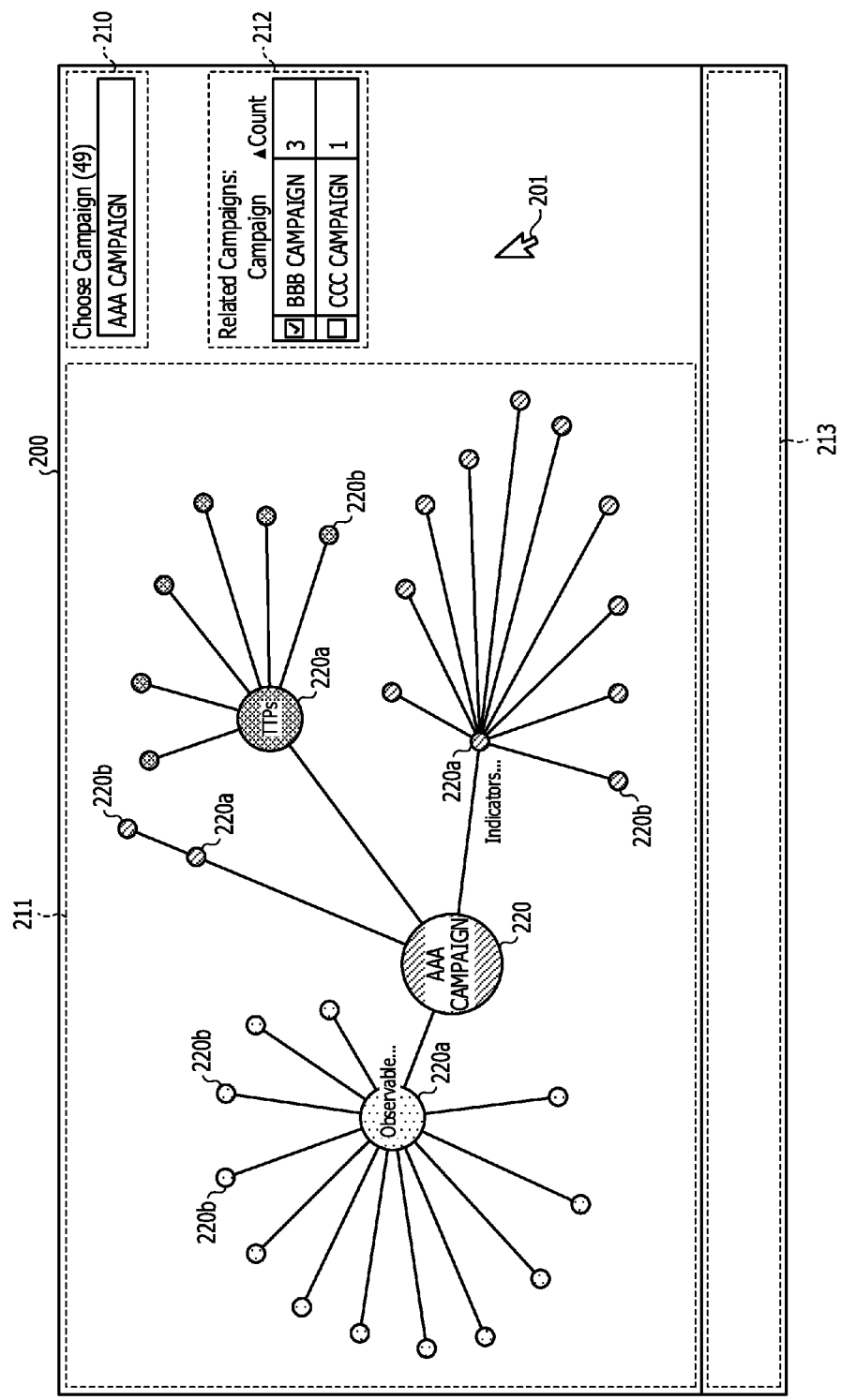
FIG. 6 depicts an example of a display screen.

FIG. 6 depicts an example of a display screen. The display screen image 200 of FIG. 6 is an example of a screen displayed on the display unit 2a of the client terminal 2 based on display information output from the server apparatus 3. As depicted in FIG. 6, the display screen 200 includes a console 201, an event selection region 210, a cyber-attack event displaying region 211, a related event displaying region 212, and a detailed information displaying region 213.

The console 201 is a mouse cursor or the like that is operated in response to operation information accepted by the client terminal 2. The event selection region 210 is a region in which selection of cyber-attack event information 4 is to be performed. The client terminal 2 notifies the server apparatus 3 of the cyber-attack event information 4 selected through the event selection region 210.

The cyber-attack event displaying region 211 is a region for displaying display information output from the server apparatus 3 in regard to contents of the cyber-attack event information 4. A graph chart in which, for example, a cyber-attack activity of "AAA campaign" is set as the node 220 of the root and the node 220 is coupled by coupling lines to the nodes 220a each of which represents an attacker, an attack method, a detection index, an observation event, an incident, a corrective measure, an attack target or the like is displayed in the cyber-attack event displaying region 211. To each node 220a, information in the node is coupled as the nodes 220b by coupling lines. Accordingly, a tree structure from the node 220 of the root to the nodes 220b is displayed in the cyber-attack event displaying region 211.

For example, for the node 220a of the attacker (Threat_Actors), as the subordinate nodes 220b, information about persons/organizations that contribute to the cyber-attack from points of view of a type of an attacker of the cyber-attack, a motivation of the attacker, a proficiency of the attacker, an intention of the attacker and so forth is displayed.

For the node 220a of the attack method (TTPs), information about an attack pattern, a resource such as malware or a tool used by an attacker, an attack base of the attacker, and an attack target is displayed as the subordinate nodes 220b.

For the node 220a of the detection index (Indicators), information indicative of an index that characterizes a cyber-attack event is displayed as the subordinate node 220b.

For the node 220a of the observation event (Observables), information indicative of an event relating to an operation observed in a cyber-attack event is displayed as the subordinate node 220b.

For the node 220a of the incident (Incidents), information of a case caused by a cyber-attack is displayed as the subordinate node 220b.

For the node 220a of the corrective measure (Courses_Of_Action), information indicative of a measure for dealing with a threat by a cyber-attack event is displayed as the subordinate node 220b.

For the node 220a of the attack target (Exploit_Targets), information indicative of a weak point of an asset that becomes a target of an attack in a cyber-attack event such as a weak point of software or a system that may become a target of an attack is displayed as the subordinate node 220b.

Accordingly, the user may readily understand contents of the cyber-attack activity of "AAA campaign" by confirming the tree structure of the cyber-attack event displaying region 211. For example, the user may readily understand contents of 5W1H in a cyber-attack from a relation between each of the categories of the attacker, attack method, detection index, observation event, incident, corrective measure, or attack target and corresponding subordinate information of them.

The related event displaying region 212 is a region in which display information generated by the display information generation unit 35 in response to a search result of the search unit 34 is to be displayed. For example, in the related event displaying region 212, a search result of cyber-attack event information having a given similarity to the cyber-attack event information 4 is displayed. As an example, cyber-attack activities such as "BBB campaign" or "CCC campaign" having a similarity to a cyber-attack activity of the cyber-attack event information 4 are displayed in a list. In the related event displaying region 212, information indicative of a similarity degree such as "Count" indicative of the number of child factors that coincide with each other in contents is displayed. From the related event displaying region 212, the user may confirm the cyber-attack event information 4 having a given similarity to the cyber-attack event information 4.

In the related event displaying region 212, selection of a given cyber-attack activity from within a list of cyber-attack activities is accepted by an operation of the console 201. If selection of a cyber-attack activity is accepted, display information for displaying the cyber-attack activity selected as "display of similar event" in the cyber-attack event displaying region 211 is generated by the display information generation unit 35. Based on the display information, in the cyber-attack event displaying region 211, contents of the cyber-attack activity selected through the related event displaying region 212 is displayed together with the contents of the cyber-attack event information 4.

The detailed information displaying region 213 is a region in which details and so forth of a node selected through the console 201 from among the nodes 220, 220a, and 220b in the cyber-attack event displaying region 211 are to be displayed. For example, in response to an operation of the console 201, selection of a given node from among the nodes 220, 220a, and 220b is accepted. When selection of a node is accepted, display information for displaying the selected node as "node selection" in the detailed information displaying region 213 is generated by the display information generation unit 35. Based on the display information, detailed information of the node selected through the cyber-attack event displaying region 211 is displayed in the detailed information displaying region 213.

Figure 7:
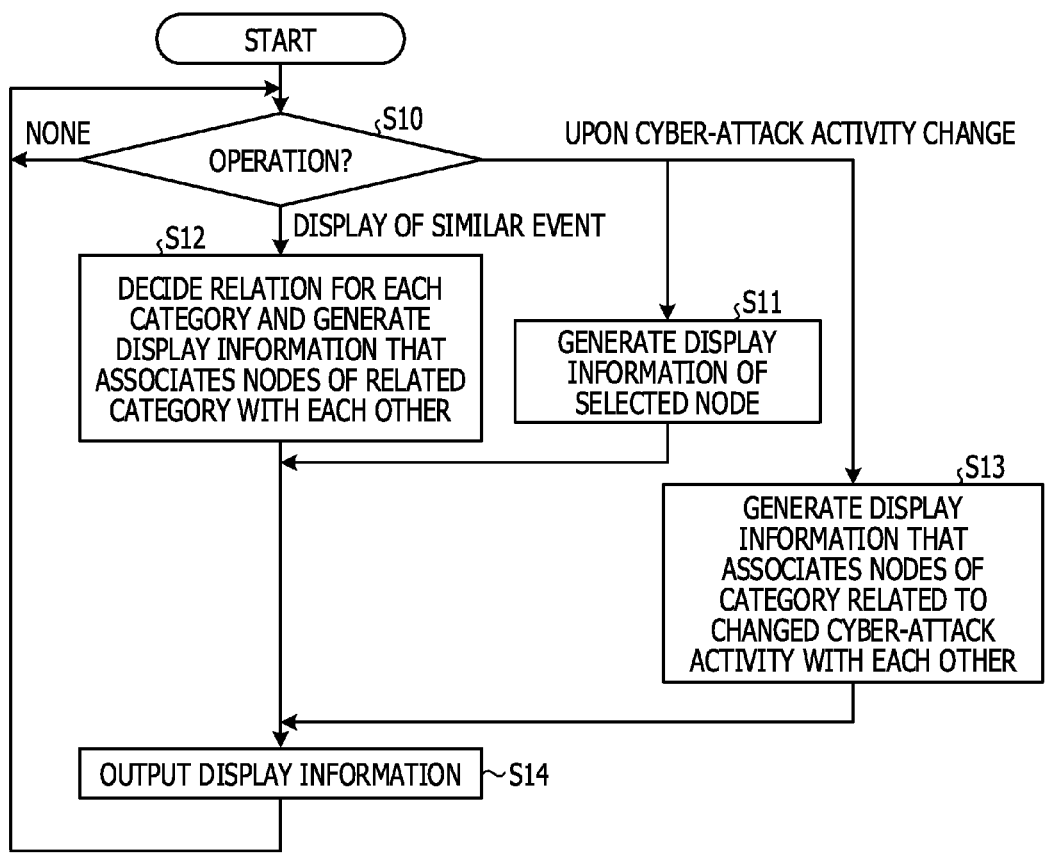
FIG. 7 illustrates another example of operation of a server apparatus.

FIG. 7 illustrates another example of operation of a server apparatus. In FIG. 7, a process for generating display information based on an operation of the console 201 is illustrated.

As illustrated in FIG. 7, after process is started, the display information generation unit 35 performs a decision of an operation of "node selection," "display of similar event," "none" indicating that there is no given operation, or "upon cyber-attack activity change" based on operation information accepted from the client terminal 2 (S10).

In the case of "none" indicating that there is no given operation, the display information generation unit 35 stands by for process. In the case of "node selection," the display information generation unit 35 reads out detailed information of the node selected by the console 201 from among the nodes 220, 220a, and 220b from the cyber-attack event information 4 and generates display information for displaying the read out detailed information (S11).

In the case of "display of similar event," the display information generation unit 35 reads out information of the cyber-attack activity selected through the related event displaying region 212 from the cyber-attack event information DB 5. Then, the display information generation unit 35 performs a syntax analysis of the cyber-attack event information read out from the cyber-attack event information DB 5, and analyzes a tree structure in which a cyber-attack activity, an attacker, an attack method, a detection index, an observation event, an incident, a corrective measure, an attack target or the like is set as a representative node and information in each node is set as a subordinate node. The display information generation unit 35 generates display information of a graph chart indicative of the tree structure regarding the cyber-attack activity selected through the related event displaying region 212.

The display information generation unit 35 decides, for each of the categories, a relation between the graph chart of the cyber-attack event information 4 and the graph chart of the cyber-attack activity selected through the related event displaying region 21. For example, the display information generation unit 35 compares child factors (information in factors) of the factors (a cyber-attack activity, an attacker, an attack method, a detection index, an observation event, an incident, a corrective measure, an attack target and so forth) in the cyber-attack events with each other. Based on a result of the comparison, the display information generation unit 35 sets nodes of child factors that coincide with each other in contents as nodes of a related category. The display information generation unit 35 generates display information that associates the nodes of the related category with each other by a coupling line (S12).

The outputting unit 36 outputs the display information generated by the display information generation unit 35 at S12 or S11 to the client terminal 2 (S14). In this manner, in the client terminal 2, the display information generated by the server apparatus 3 in response to "node selection" or "display of similar event" is displayed on the display unit 2a.

Figure 8:
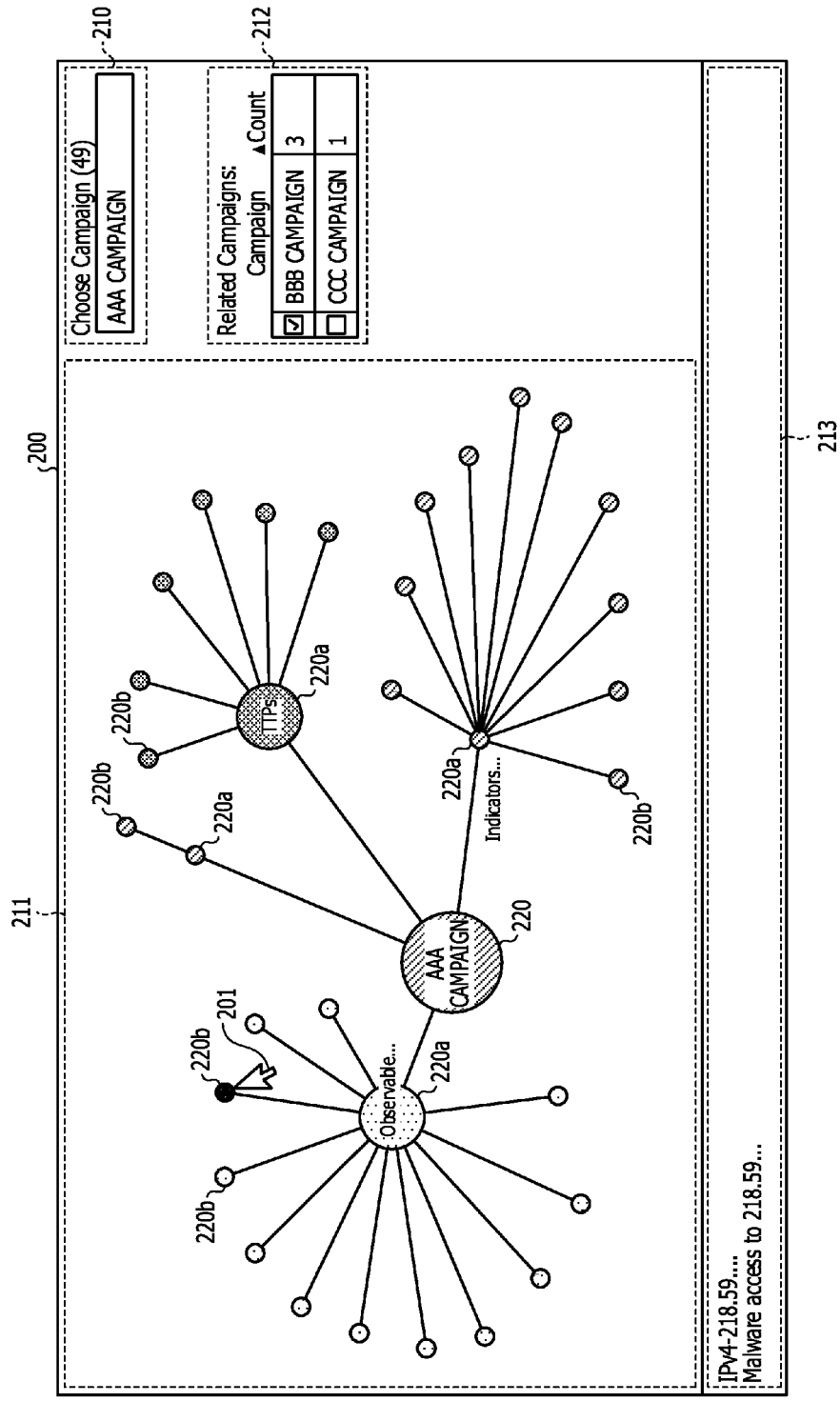
FIG. 8 depicts an example of a detailed display of nodes.

If the event selection region 210 is changed (in the case of "upon cyber-attack activity change"), display information that associates nodes of a category related to the changed cyber-attack activity with each other by a coupling line is generated (S13).[0066] FIG. 8 depicts an example of a detailed display of nodes. If the node 220, a node 220a, or a node 220b is selected detailed information of the selected node is displayed. As depicted in FIG. 8, if a node 220b is selected through the console 201 (in the case of "node selection"), detailed information of the selected node 220b is displayed in the detailed information displaying region 213. A case where the node 220 or a node 220a is selected may be also processed similarly. From the display, the user may confirm details of the node 220b.

Figure 9:
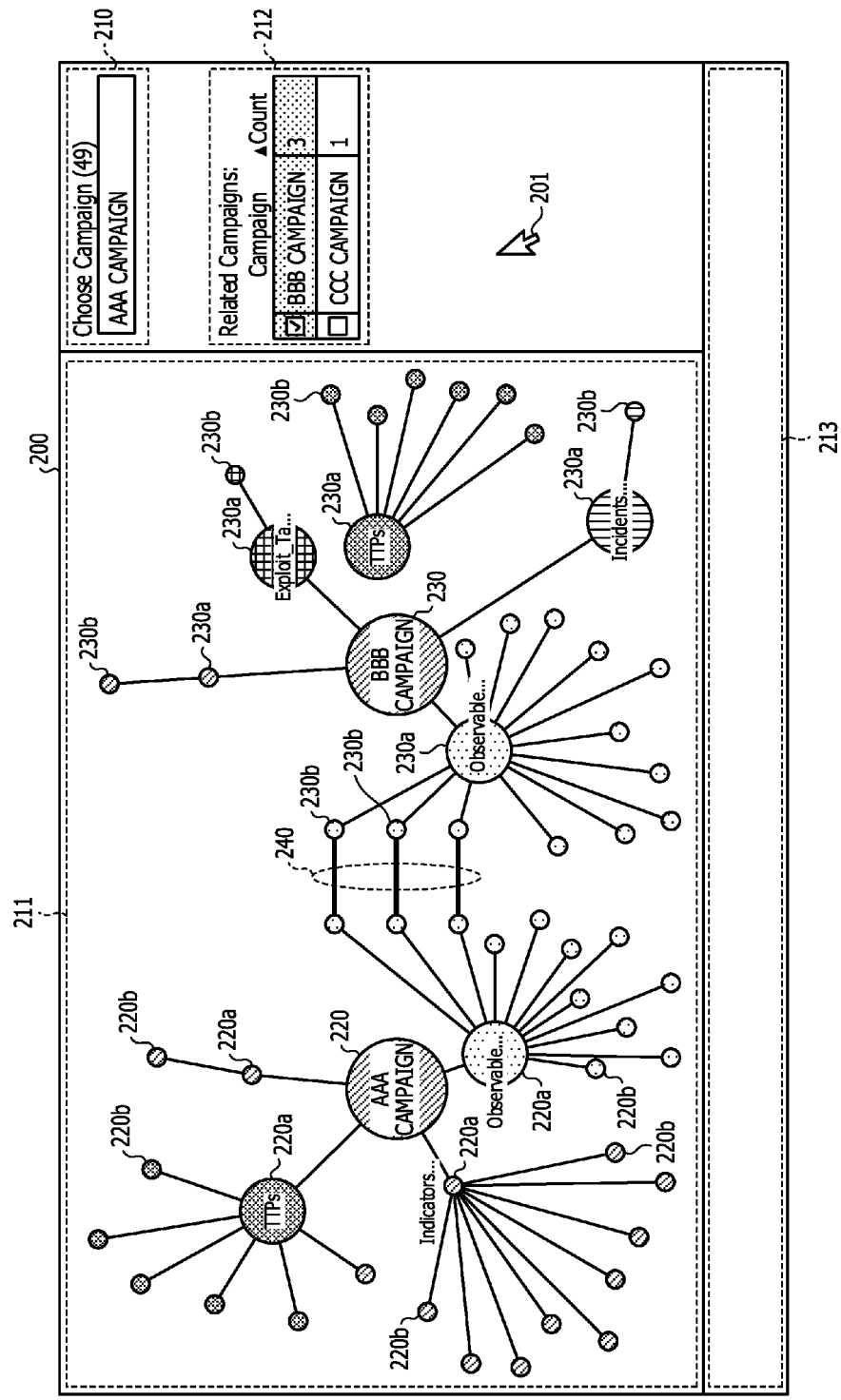
FIG. 9 depicts an example of display of cyber-attack events similar to each other.

FIG. 9 depicts an example of a display of cyber-attack events similar to each other. As depicted in FIG. 9, in the case of "display of similar event" where a given cyber-attack event (in the example depicted in FIG. 9, "BBB campaign") is selected through the related event displaying region 212, a graph chart of "BBB campaign" is displayed in the cyber-attack event displaying region 211.

For example, a graph chart in which the cyber-attack activity of "BBB campaign" is set as a node 230 of the root and the node 230 and nodes 230a that represent the attacker, attack method, detection index, observation event, incident, corrective measure, attack target or the like are coupled by coupling lines is displayed in the cyber-attack event displaying region 211. To each node 230a, information in the node is coupled as a node 230b by a coupling line. Accordingly, a tree structure from the node 230 of the root to the nodes 230b is displayed in the cyber-attack event displaying region 211. Consequently, the user may readily understand contents of "BBB campaign" similar to "AAA campaign" in the cyber-attack event information 4.

Association display 240 of the graph chart of "AAA campaign" and the graph chart of "BBB campaign" is performed in which nodes of a related category with each other are coupled to each other by coupling lines. Consequently, the user may readily recognize the relation between the associated nodes of "BBB campaign" similar to "AAA campaign."

As described above, the server apparatus 3 accepts registration of cyber-attack event information 4 regarding part or all of each of the categories of the attacker, attack method, detection index, observation event, incident, corrective measure, and attack target regarding a cyber-attack event according to detection of malware in an information processing system of a monitoring target. When the server apparatus 3 is to perform display of the cyber-attack event information 4 registered regarding the cyber-attack event, the server apparatus 3 generates display information where the information to be displayed is displayed in a state in which the corresponding category is coupled with coupling lines as the nodes 220a and 220b subordinate to the node 220 representing the category. The server apparatus 3 outputs the generated display information to the client terminal 2.

The client terminal 2 displays, based on the display information, each of the categories of the attacker, attack method, detection index, observation event, incident, corrective measure, or attack target in the event of the cyber-attack event information 4 in a state of being coupled with coupling lines as the nodes 220a and 220b subordinate to the node 220 representing the category on the display unit 2a. Accordingly, on the client terminal 2, a relation between each of the categories of the attacker, attack method, detection index, observation event, incident, corrective measure, or an attack target in the cyber-attack event and subordinate information of the category, for example, contents of the cyber-attack event, may be presented to a user in a manner easy to understand. It is to be noted that, for example, the user may readily understand the contents of 5W1H in the cyber-attack from the relation between each of the categories of the attacker, attack method, detection index, observation event, incident, corrective measure, or attack target and subordinate information of the category.

All or part of the components of the apparatus and devices described hereinabove with reference to the drawings may be functionally or physically disintegrated from or integrated with each other in an arbitrary unit in response to various loads, usage situations and so forth.

All or arbitrary part of the various processing functions performed by the server apparatus 3 may be executed by a central processing unit (CPU) (or a microcomputer such as a micro processing unit (MPU) or a micro controller unit (MCU)). All or arbitrary part of the various processing functions may be executed on a program that is analyzed and executed by a CPU (or a microcomputer such as an MPU or an MCU) or on hardware by wired logic. The various processing functions performed by the server apparatus 3 may be executed through cooperation of a plurality of computers by crowd computing.

The analysis supporting system 1 of the client/server (C/S) model including the client terminal 2 and the server apparatus 3 may be provided. The analysis supporting system 1 includes an apparatus configuration of the unitary client terminal 2 wherein the various processing functions of the server apparatus 3 are executed by the client terminal 2 side. The cyber-attack event information 4 may be acquired from a different apparatus by the server apparatus 3 without the intervention of the client terminal 2.

Figure 10:
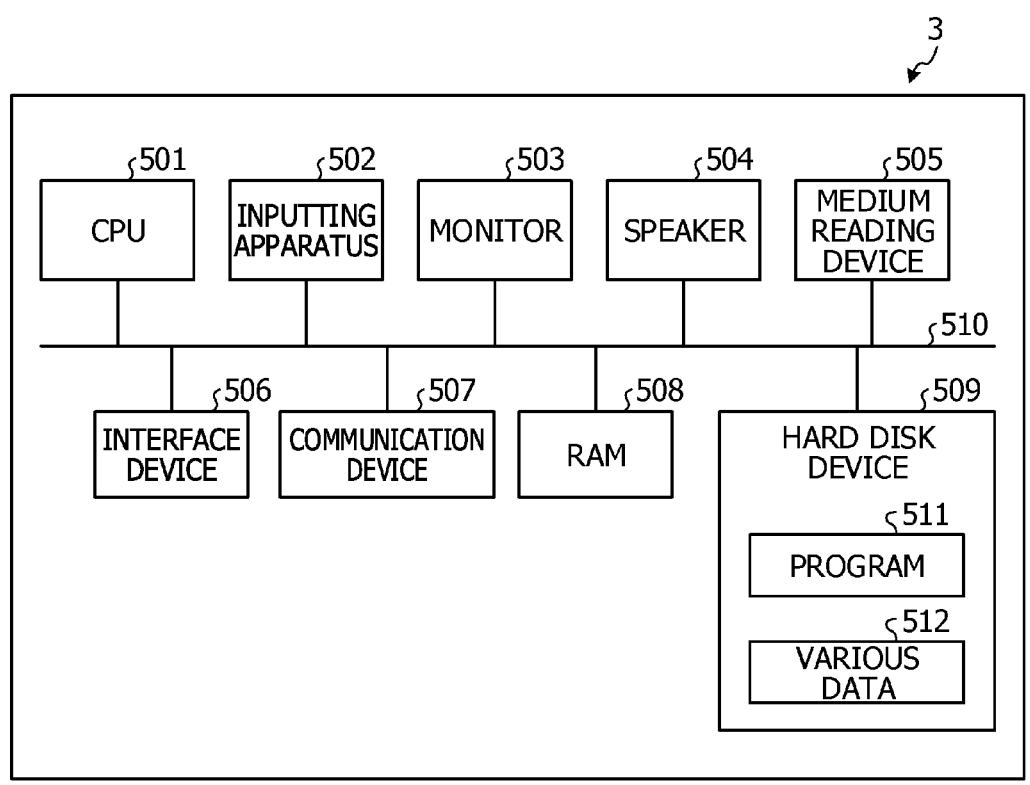
FIG. 10 depicts an example of a hardware configuration of a server apparatus.

The processes described hereinabove may be implemented by a computer executing a program prepared in advance. Therefore, in the following, an example of a computer (hardware) that executes a program having functions similar to those of the embodiment described above is described. FIG. 10 depicts an example of a hardware configuration of a server apparatus.

As depicted in FIG. 10, the server apparatus 3 includes a CPU 501 that executes various arithmetic operation processes, an inputting apparatus 502 that accepts a data input, a monitor 503, and a speaker 504. The server apparatus 3 further includes a medium reading device 505 that reads a program and so forth from a storage medium, an interface device 506 for coupling to various apparatus, and a communication device 507 for coupling for communication to an external apparatus in a wired or wireless manner. The server apparatus 3 further includes a random access memory (RAM) 508 for temporarily storing various kinds of information and the hard disk device 509. The internal components (501 to 509) of the server apparatus 3 are coupled to a bus 510.

In the hard disk device 509, a program 511 for executing various processes of the inputting unit 31, registration unit 32, search unit 34, display information generation unit 35, and outputting unit 36 described above is stored. Into the hard disk device 509, various data 512 to be referred to by the program 511, for example, the cyber-attack event information DB 5, is stored. The inputting apparatus 502 accepts an input, for example, of operation information from an operator. The monitor 503 displays various screen, for example, to be operated by the operator. The interface device 506 is coupled, for example, to a printing apparatus. The communication device 507 is coupled to a communication network such as a local area network (LAN) such that the communication device 507 exchanges various kinds of information with an external apparatus through the communication network.

The CPU 501 reads out the program 511 stored in the hard disk device 509, deploys the program 511 into the RAM 508 and then executes the program 511 to perform various processes. The program 511 may not be stored in the hard disk device 509. For example, the CPU 501 may read out and execute the program 511 stored in a storage medium that is readable by the server apparatus 3. The storage medium readable by the server apparatus 3 may be a portable recording medium such as a compact disc read only memory (CD-ROM), a digital versatile disc (DVD) disk, or a universal serial bus (USB) memory, a semiconductor memory such as a flash memory, a hard disk drive or the like. An apparatus coupled to a public network, the Internet, a LAN or the like may store the program 511 therein such that the program 511 is read out and executed by the server apparatus 3.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory recording medium encoded with a cyber-attack analysis supporting program, where the cyber-attack analysis supporting program, when executed by a processor, is operable to:
   accepting registration of pieces of information each including one or more items regarding respective cyber-attack events in response to detection of malware in an information processing system of a monitoring target;
   displaying each of the pieces of information registered regarding the respective cyber-attack events in a state in which each of the one or more items is coupled as a subordinate node to a representative node of the respective cyber-attack events;
   displaying pieces of data of the one or more items in a state in which each of the pieces of data is coupled as a sub-subordinate node to a node of the one or more items; and
   displaying a coupling state between a first sub-subordinate node of the representative node of one of the cyber-attack events and a second sub-subordinate node of the representative node of another of the cyber-attack events when the first sub-subordinate node is associated with the second sub-subordinate node to recognize a relation between the one of the cyber-attack events and the another of the cyber-attack events.

2. The non-transitory recording medium according to claim 1, wherein the one or more items include an attacker, an attack method, a detection index, an observation event, an incident, a corrective measure, or an attack target.

3. The non-transitory recording medium according to claim 2, wherein the information of the attacker includes information regarding at least one of a transmission source mail address of the cyber-attack event and an account of a social network service.

4. The non-transitory recording medium according to claim 2, wherein the information of the attack method includes information of a pattern of an attack, a resource used by the attacker, an attack base of the attacker, or an attack target.

5. The non-transitory recording medium according to claim 2, wherein the information of the detection index includes information indicative of an index that characterizes the cyber-attack event.

6. The non-transitory recording medium according to claim 2, wherein the information of the observation event includes information indicative of an event relating to an operation observed in the cyber-attack event.

7. The non-transitory recording medium according to claim 2, wherein the information of the incident includes information regarding at least one of an owner or a manager of an asset damaged by the attacker and a place of the asset.

8. The non-transitory recording medium according to claim 2, wherein the information of the corrective measure includes information indicative of a measure to cope with a threat by the cyber-attack event.

9. The non-transitory recording medium according to claim 2, wherein the information of the attack target includes information indicative of a weak point of an asset that becomes a target of an attack in the cyber-attack event.

10. A cyber-attack analysis supporting method, comprising:
   accepting registration of pieces of information each including one or more items regarding respective cyber-attack events in response to detection of malware in an information processing system of a monitoring target;
   displaying each of the pieces of information registered regarding the respective cyber-attack events in a state in which each of the one or more items is coupled as a subordinate node to a representative node of the respective cyber-attack events;
   displaying pieces of data of the one or more items in a state in which each of the pieces of data is coupled as a sub-subordinate node to a node of the one or more items; and
   displaying a coupling state between a first sub-subordinate node of the representative node of one of the cyber attack events and a second sub-subordinate node of the representative node of another of the cyber-attack events when the first sub-subordinate node is associated with the second sub-subordinate node to recognize a relation between the one of the cyber-attack events and the another of the cyber-attack events.

11. The cyber-attack analysis supporting method according to claim 10, wherein the one or more items include an attacker, an attack method, a detection index, an observation event, an incident, a corrective measure, or an attack target.

12. A cyber-attack analysis supporting apparatus, comprising:
   a memory that stores a cyber-attack analysis supporting program; and
   a processor that executes a method based on the cyber-attack analysis supporting program, wherein the method includes:
   accepting registration of pieces of information each including one or more items regarding respective cyber-attack events in response to detection of malware in an information processing system of a monitoring target;
   displaying each of the pieces of information registered regarding the respective cyber-attack events in a state in which each of the one or more items is coupled as a subordinate node to a representative node of the respective cyber-attack events;
   displaying pieces of data of the one or more items in a state in which each of the pieces of data is coupled as a sub-subordinate node to a node of the one or more items; and
   displaying a coupling state between a first sub-subordinate node of the representative node of one of the cyber attack events and a second sub-subordinate node of the representative node of another of the cyber-attack events when the first sub-subordinate node is associated with the second sub-subordinate node to recognize a relation between the one of the cyber-attack events and the another of the cyber-attack events.

13. The cyber-attack analysis supporting apparatus according to claim 12, wherein the one or more items include an attacker, an attack method, a detection index, an observation event, an incident, a corrective measure, or an attack target.

* * * * *